United States Patent [19]

Coon et al.

[11] Patent Number: 4,551,041

[45] Date of Patent: Nov. 5, 1985

[54] VIBRATION METHOD FOR UNPLUGGING A SLURRY PIPELINE

[75] Inventors: Julian B. Coon, Ponca City, Okla.; Eston F. Petry, Barrackville, W. Va.

[73] Assignee: Conoco Inc., Ponca City, Okla.

[21] Appl. No.: 619,744

[22] Filed: Jun. 11, 1984

[51] Int. Cl.⁴ .............................................. B65G 53/66
[52] U.S. Cl. ........................................ 406/85; 4/255; 134/1; 134/22.12; 134/24; 134/169 C; 406/191; 406/197
[58] Field of Search ...................... 406/11, 45, 85, 191, 406/192, 197; 4/255, 256, 257; 134/1, 24, 22.12, 166 C, 167 C, 168 C, 169 C

[56] References Cited

U.S. PATENT DOCUMENTS

| 2,267,064 | 12/1941 | Wikelund | 4/255 |
| 2,621,668 | 12/1952 | Crispin | 134/169 C |
| 2,877,781 | 3/1959 | Lipp et al. | 134/166 C |
| 4,389,143 | 6/1983 | Nadin et al. | 406/45 X |

FOREIGN PATENT DOCUMENTS

| 43728 | 3/1984 | Japan | 406/197 |
| 756047 | 8/1980 | U.S.S.R. | 406/191 |

*Primary Examiner*—Jeffrey V. Nase
*Attorney, Agent, or Firm*—William J. Miller

[57] ABSTRACT

Method for unplugging a pipeline filled with fluid and solid material by blocking the pipeline below the plugged portion, injecting pressure pulses into the pipeline on both sides of the plugged portion until the plugged portion becomes fluidized and then forcing water into and through the plugged portion to remove the plug. The method further contemplates controlling the frequency and the phase of the injected pressure pulses to best match the length of the pipeline between the injected pulses so that the pulse applied to each side of the plug is out of phase.

4 Claims, 2 Drawing Figures

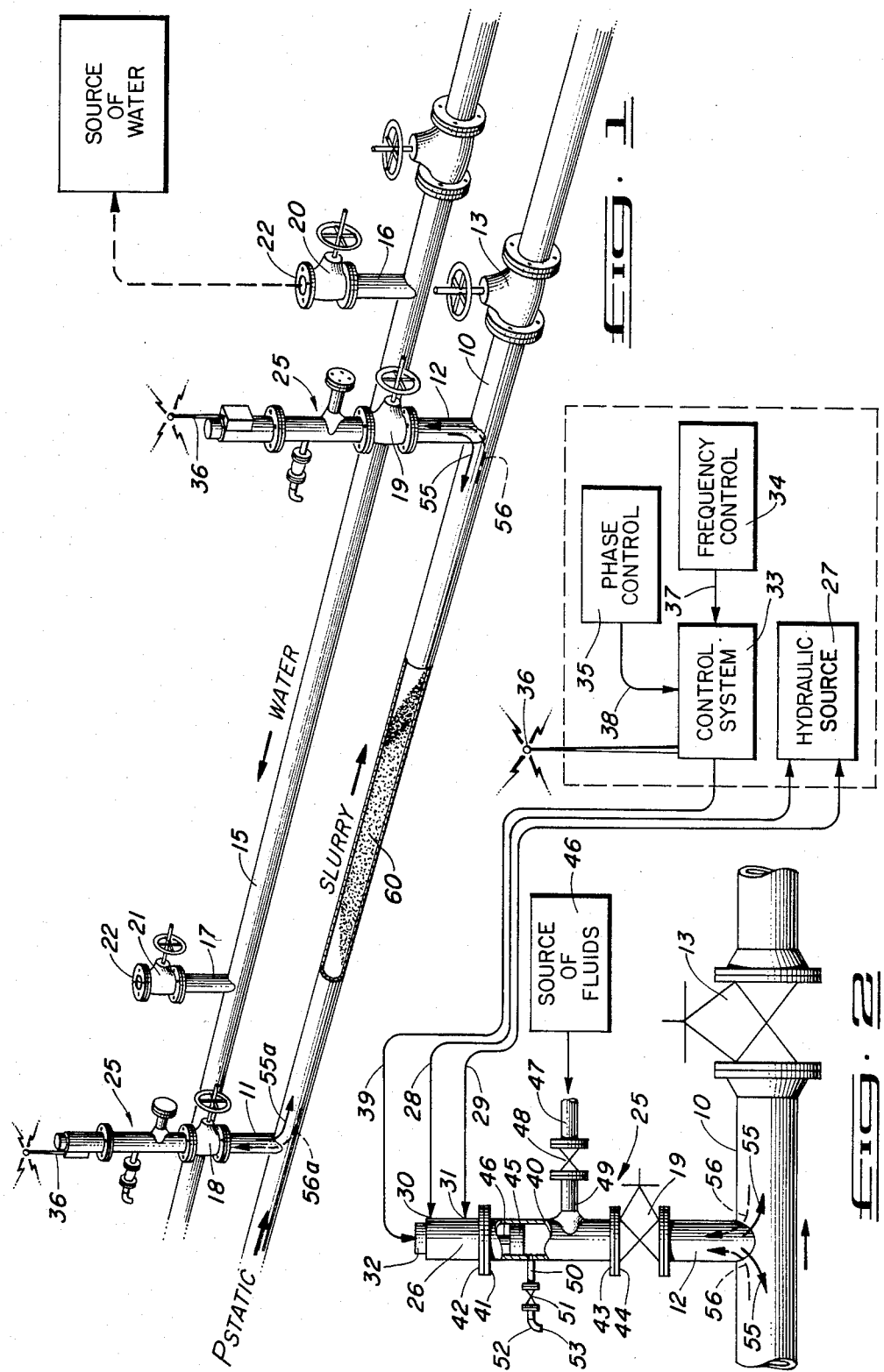

VIBRATION METHOD FOR UNPLUGGING A SLURRY PIPELINE

BRIEF DESCRIPTION OF THE PRIOR ART

Occasionally pipelines used for transportation of slurry become plugged. The reason for plugging, generally, is caused by the slurry pipeline shutting down while it is filled with slurry. Under these conditions the slurry tends to settle out forming a compact plug which is extremely difficult to remove. Most of the prior art deals with means of preventing the formation of the plug by recycling fluid. Patents illustrating the recycling concept are U.S. Pat. Nos. 3,591,239 and 3,592,512. U.S. Pat. No. 3,578,816 installs a bladder in the pipeline at the lowest point in the pipeline in order to provide a path for fluids after the pipeline is restarted. U.S. Pat. No. 3,904,248 restarts the pipeline by increasing the fluid flow rate, however, fluid flow would be impossible if the pipeline were completely plugged, therefore, the above patent will function only if there is a fluid path through the plug. In most cases such fluid paths are nonexistent. U.S. Pat. No. 3,575,469 flows gas through the pipeline in the lowest region of the line to fluidize the solids, thereby preventing the formation of solid particle plugs in the lower region of the line. None of these patents clearly addresses the problem of restarting the pipeline where a solid plug has formed.

BRIEF DESCRIPTION OF THE INVENTION

When a solid plug has formed in a pipeline, fluid pressure against the plug will not pass fluid by the plug or through the plug permitting gradual erosion and eventual removal of the plug. Most slurry pipelines are fitted with vertical risers spaced along the pipeline in both the water and slurry pipeline. The slurry pipeline normally incorporates block valves for maintenance purposes on the line. This invention contemplates placing a vibrator, fluid coupled, to the pipeline at a riser above the plug and a second vibrator, fluid coupled, to the pipeline at a riser below the plug. If the pipeline has a block valve below the plug, the efficiency of the operation can be improved by closing the block valve; however, a block valve is not necessary. Pressure pulses are then applied at a control frequency and control phase above and below the pipeline. Such pulses are applying pressure first to one side of the plug and then the opposite side of the plug gradually refluidizing the slurry particles. Once the particles are refluidized, the block valve can be opened (if it was closed) and pressure reapplied to the line so that the plug can be eroded and removed.

BRIEF DESCRIPTION OF THE FIGURES

FIG. 1 is a perspective view of a slurry line and water return line with the plug illustrated in the slurry pipeline and FIG. 2 is a detailed drawing of the vibrator and the fluid coupling pipe including a block diagram of the control system for the vibrator.

DETAILED DESCRIPTION OF THE INVENTION

Referring to both FIGS. 1 and 2 a slurry pipeline 10 contains an upstream vertical riser 11 and a downstream vertical riser 12. Slurry pipeline 10 may include a block valve 13 at several locations in the line. The water return line 15, likewise, contains an upstream vertical riser 16 and a downstream vertical riser 17. All of the vertical risers 11, 12, 16 and 17 contain block valves 18, 19, 20, and 21, respectively. Many pipelines, likewise, have horizontal coupling pipes between valves 19 and 20 or valves 18 and 21, for example. These are not shown. Each of the valves is generally capped with a plate 22 to prevent foreign material from entering the valve. Generally, the valves 18 through 21 will be underground and located in a concrete box in order to provide access to the valves. In order to carry out the method, end plate 22 is removed and vibrator apparatus generally referred to by arrow 25 is installed. Vibrator apparatus 25 is fully described with reference to FIG. 2 and will be specifically described with respect to riser 12. A hydraulic vibrator 26 is illustrated as having a hydraulic source 27 with hydraulic coupling lines 28 and 29 attached to hydraulic inputs 30 and 31, respectively. It is obvious, of course, that other type vibrators can be used than hydraulic vibrators. An example is an electromagnetic vibrator in which case the hydraulic source would be a generator for the necessary controls for generating the proper frequency and phase useful for carrying out the method. Such vibrator is state of the art and will not be further detailed.

In order to properly control vibrator 26, a control valve 32 is attached to the hydraulic input. This valve is generally a spool valve with an electromagnetic input which can be controlled by any electric system 33. Control system 33 has a frequency control input 34 and a phase control input 35. Phase control input 35 controls not only the phase of vibrator 26 but also transmits a controlled phase along with the proper frequency to antenna 36. A frequency control 34 and phase control 35 are inputted to the control system through circuit means 37 and 38, respectively. The control system 33 is inputted to the control valve 32 through a wire or any circuit means 39. A pipe 40 has a flange 41 at one end which is attached to a mating flange 42 on vibrator 26. It is obvious that one can construct the pipe and the vibrator as one unit. The flange provides ease in maintenance of the assembly. Pipe 40 contains a flange 43 which will mate with flange 44 of valve 19. Inside pipe 40 is mounted a piston 45 which is attached therethrough a rod 46 to the mechanical output of vibrator 26 (not shown). Piston 45 can contain any number of piston rings or "O" rings or whatever means are necessary to provide proper operation of the piston and fluid assembly. In order to provide a proper fluid coupling into pipe 10, fluid must be added to the inside of pipe 40 and valve 19. Furthermore, if pipe 10 has drained, then pipe 10 must be filled with fluid as well as valve 19 and pipe 40. To accommodate the above, a source of fluid 46 (which may be water line 15 through a crossover horizontal pipe which is not shown) is coupled through a pipe 47 and a block valve 48 to a pipe 49 which will port the water into pipe 40. If a proper fluid coupling is to be made, all of the air in pipe 49 must be removed. To accommodate the above, a bleed pipe 50 is coupled through valve 51 to a pipe 52 which is open to the atmosphere at its outlet 53.

The entire assembly comprising control system 33 with the frequency control 34 and phase control 35 along with hydraulic source 27 and antenna 36 can be made portable. It can be on skids and moved to a remote location by helicopter, truck or any other transportation means. Furthermore, a source of fluid can be transported in any convenient manner if a crossover horizontal pipe or vertical riser is not available at the location where the vibrators are installed. Furthermore, it is obvious that the vibrators can be transported in the same manner as the control system and hydraulic source, etc.

Operation

The apparatus of FIG. 2 will be first discussed and then its use on the method shown in FIG. 1 will be followed.

Referring to FIG. 2 a vibrator 26, if not already attached to pipe 40, will have the piston 45 inserted in pipe 40 and bolted together at flanges 41 and 42. Flange 43 will then be positioned over flange 44 and bolted in the usual manner. The hydraulic source may then be connected to pipes 28 and 49 to inputs 30 and 31 and the control system 33 can be connected through wire 39 to control valve 32. A source of water 46 is then coupled to pipe 47 and valve 48 opened so that fluid can flow through pipe 49 into pipe 40. If pipe 10 is already under pressure, then valve 19 should not be opened until the fluids in pipe 49 reach the same pressure. As pipe 40 is filled with fluids, valve 51 is open so that any air inside pipe 40 can escape. It is obvious that piston 45 should be in its uppermost position so that the entire chamber will be filled with fluid. The above can be accommodated easily by applying hydraulic pressure to input 31. If pipe 10 has been drained, then valve 19 is opened and the entire pipe 10 is filled with fluid along with valve 19 and pipe 40. It should be obvious that, if a horizontal crossover is available at a lower point in the line between water line 15 and 10, then the fluids can be added at the alternate lower location until pipe 10 is filled. Valve 13 will, of course, be open during the filling process if the fill location is below valve 13. Once line 10 is filled with fluid, valve 19 is open, valve 48 will be closed along with valve 51. Valve 13 may also at this time be closed. Hydraulic source 27 is then activated moving piston 45 axially in pipe 40. Such axial movement will develop a pressure pulse as indicated by solid arrows 55 when piston 45 is moved in a downwardly direction and will create a pressure pulse in the direction of dotted arrow 56 when piston 45 travels in an upwardly direction.

Referring to FIGS. 1 and 2, a pressure pulse in the direction of arrow 55, for example, will be generated in pipe 10 toward plug 60 in slurry line 10. Simultaneously with the transmission of a signal to vibrator 25, control system 33 will generate a signal in antenna 36 which will be received by the vibrator 25 mounted on the upstream vertical riser 11. This antenna will then communicate similar information as to frequency and necessary phase to vibrator 25 on riser 11. A similar signal 55a will be transferred to pipeline 10 when the piston is in a downwardly stroke and a pressure pulse in the direction of 56a will be transmitted into the fluid when the vibrator is in an upwardly stroke. If the vibrator 25 on riser 12 is properly phased with the vibrator 26 on riser 11, then pressure pulses 55 and 55a will cooperate to fluidize plug 60 from both sides while simultaneously transmitting a pressure pulse through the plug in order to assist in total fluidization. Periodically, pressure will be applied to the fluids from the slurry pump in slurry line 10 to determine if the plug has been fluidized to an extent where water will pass over or through plug 60. Once any channel is formed through plug 60, continuous movement of water through pipe 10 will erode the plug to the point where it will be totally removed. The proper frequency and phase will depend upon the length of the line between risers 11 and 12 and the nature of plug 60. These can be easily adjusted by frequency control 34 and phase control 35.

Alternate Method

A second method for breaking a plug is to mount a vibrator apparatus 25 on upstream riser 11 only. The upstream pumps are then operated to generate a pressure, Pstatic, against plug 60. Vibrator 25 is then operated as described in the previous method. Repetitive pressure pulses 55a and 55b, being applied to plug 60, will begin to fluidize plug 60 eventually breaking the plug. With Pstatic continuously applied to plug 60, once the plug is breached, flowing fluid will erode the remainder of the plug.

It is obvious that pressure pulses can be formed in several ways. The most important concept is to fluidize the plug so it can be eroded by the upstream fluid. Such apparatus as a bladder coupled to the riser 11 and 9 through a hose, for example, with the bladder vibrated by a portable vibrator or other apparatus is well within the skill of the art as contemplated by the inventor.

It is also obvious that more than two vibrators can be applied to a plugged line if necessary.

Also other than continuous or constant frequency signals are contemplated, for example, a swept frequency of any type can be used.

It is also obvious that during the vibration mode the pressure being applied by vibrator 25 should not exceed the static pressure being applied to the line when the vibrator is moving in the direction of arrow 56 or 56a so that the vibrator will not uncouple from the fluid column.

It is obvious that changes can be made in the application and still be within the spirit and scope of the invention as disclosed in the specification and appended claims.

What is claimed is:

1. A method for unplugging a pipeline containing a plugged portion filled with fluids and solid material comprising:
  a. injecting pressure pulses into said pipeline upstream and downstream of said plugged portion and against the plugged portion;
  b. controlling the frequency and phase of said injected pulses; and
  c. forcing fluids under pressure against said plugged portion, whereby said pressure pulses will fluidize said plugged portion and said forced fluid will cause the removal of said plugged portion.

2. A method as described in claim 1 wherein said steps are repeated a plurality of times to remove said plugged portion.

3. A method as described in claim 1 wherein said frequency is held constant and said phase between said pressure pulses below and above said plugged portion is shifted.

4. A method as described in claim 1 wherein said phase is held constant between said pressure pulses below and above said plugged portion and where said frequency is varied.

* * * * *